United States Patent [19]
Smothers

[11] Patent Number: 5,313,770
[45] Date of Patent: May 24, 1994

[54] JAM-PROOF ROTARY WEED CUTTER

[76] Inventor: Odis B. Smothers, P.O. Box 145, Flippin, Ark. 72634

[21] Appl. No.: 980,201

[22] Filed: Nov. 23, 1992

[51] Int. Cl.$^5$ .............................................. A01D 34/68
[52] U.S. Cl. ...................... 56/12.7; 56/16.7; 30/276
[58] Field of Search ................ 56/12.1, 12.7, 16.7; 30/276

[56] References Cited

U.S. PATENT DOCUMENTS

| | | | |
|---|---|---|---|
| 3,859,776 | 1/1975 | Ballas et al. | 56/12.7 |
| 4,145,809 | 3/1979 | Proulx | 30/276 |
| 4,630,371 | 12/1986 | Graham | 56/12.7 X |

Primary Examiner—Terry Lee Melius
Attorney, Agent, or Firm—Stephen D. Carver

[57] ABSTRACT

A rotary weed cutter or trimmer establishes two cone shaped guard volumes about the drive shaft to prevent weeds or vines, whether cut or uncut, from wrapping around the shaft during operations. A motor-driven weed cutting machine drives a main filament spool mounted on the drive shaft. When the spool is rotated at high speed by the motor the filaments create a conventional cutting plane. An auxiliary spool is employed to create a guard zone comprising two cone shaped guard volumes coaxial with the drive shaft. The auxiliary spool is mounted on the shaft between the main spool and the frame of the machine. The hub of the auxiliary spool defines a central orifice to accommodate the shaft. An upper disk and a lower disk extend from the hub. A plurality of holes are drilled about the periphery of the disks. Cutting line or braided wire is disposed through the holes. Each of the bitter ends of the line or wire are left unanchored to provide cutting action in the vicinity of the shaft. When rotated at high speeds the auxiliary spool's cutting lines create an impenetrable guard zone about the drive shaft that cannot be traversed by weeds or the like.

17 Claims, 3 Drawing Sheets

JAM-PROOF ROTARY WEED CUTTER

BACKGROUND OF THE INVENTION

This invention broadly relates to rotary weed cutters and grass trimmers. More particularly my invention relates to rotary weed cutters that feed filaments out from rotating drive shafts to cut or trim weeds. Art pertinent to the present invention is classified in U.S. Class 30, subclass 276.

As will be appreciated by those skilled in the art, rotary weed cutters and grass trimmers employing flails have been present in the art for some time. The flails are made of various types of filaments, plastic or metal. Versatility of such devices over conventional lawn mowers or other grass cutting equipment is readily obvious. An operator may cut extremely close to structures or shrubbery or plants without a housing interfering with the ability to trim closely. Another advantage of course is the relative safety of the device. While it is not advisable for one to come into contact with the flails of such a weed cutter, it is surly not as dangerous as the solid blade of a conventional lawn mower.

Along with the aforementioned advantages some disadvantages are present in prior art weed cutters. Most weed cutters employ a housing or some other structure mounting a motor whether electric or internal combustion. A shaft extends from the motor through the housing to mount a spool or similar body to which the flails are attached or extend from. Weeds or vines often become wrapped around the shaft or housing. As these weeds or vines build up and tangle they eventually cause a drag on the motor. As a result the device slows to a speed where it will no longer cut, or it locks-up entirely. Such a lock-up is not only inconvenient but may also damage an electric motor or clutches associated with internal combustion engines. Several means have been proposed to eliminate such jamming.

Weed cutting devices employing flails are disclosed in numerous U.S. Pat. Nos. including 3,708,967; 3,826,068; 3,859,776 and 4,136,446.

U.S. Pat. No. 4,145,809, issued to Prouix discloses a weed cutting device with a rotary spool from which plastic wire outwardly projects. It provides a plurality of radially spaced apart rigid ramps which violently contact the weeds to prevent entanglement with the spool or shaft.

As disclosed in U.S. Pat. No. 4,223,441 issued Sep. 23, 1980, to Robert G. Everts it is known in the art to employ wire as well as plastic line as a flail.

An active, anti-jamming system for rotary weed cutters appears to be unknown. Hence, it is desirous to provide a weed cutter with the capacity to actively prevent weeds or vines, whether cut or uncut, from wrapping around the shaft during cutting. Not only will such an improvement speed the process of trimming or cutting weeds, it will also prevent damage to the drive motors and other systems related to the operation of the weed cutter.

SUMMARY OF THE INVENTION

My improved rotary weed cutter provides an active system to prevent jamming of the weed cutter's shaft. Specifically, the present invention creates a guard volume about the shaft to prevent weeds or vines, whether cut or uncut, from wrapping around the shaft during operations. As a result, the efficiency and durability of the weed cutter and its components are improved.

The weed cutting machine employs an electric or internal combustion motor mounted to a frame. The motor drives a shaft on which cutting line spools are mounted. Such a shaft may employ a key way and key stock to register components mounted on the shaft. In the present invention a main spool known to the art is mounted on the shaft. The motor provides rotation to the shaft and thereby the main spool. The main spool mounts two or more filaments. When the spool is rotated at high speed by the motor the filaments create a conventional cutting plane capable of cutting weeds, vines and the like.

In the present invention an auxiliary spool is employed to create a guard volume having two, cone shaped regions. The auxiliary spool is mounted on the shaft between the main spool and the frame. The auxiliary spool defines a central orifice to accommodate the shaft. One or more set screws secure the auxiliary spool at a fixed position on the shaft.

The auxiliary spool has a plurality of holes drilled about its periphery. Cutting line or braided wire is disposed through the orifices. Each of the bitter ends of the line or wire are left unanchored to provide cutting action in the vicinity of the shaft. When the auxiliary spool is rotated at high speed, cone shaped guard volumes extending upward and downward from the auxiliary spool are created. The primary purpose of these cone shaped guard volumes is to cut weeds or vines before they can wrap about the machine's shaft. This prevents the drag or jamming that is commonplace in prior art machines.

The guard volume prevents weeds and the like from contacting the drive shaft. It extends from the cutting plane established by the conventional filaments to a point above the drive shaft. The drive shaft is thus isolated from contact with obstacles that might otherwise wind about it and hinder proper operation of the machine.

Therefore a basic object of my invention is to provide jam-proof rotary weed cutter.

Another basic object of my invention is to provide a jam-proofing arrangement for a variety of different rotary weed cutters.

Thus it is an important object to provide a jam-proofing arrangement that can be used with self propelled, push-type, or hand-held portable weed trimmers or cutters.

A primary object of the present invention is to provide rotary weed cutter with an active system to aggressively avoid jamming.

Another fundamental object is to provide a weed cutter that prevents the winding of weeds, vines and grass around the turning shaft.

A further object of my invention is to produce a savings of labor and time associated with the operation of a rotary weed cutter.

Another object of the present invention is to provide a weed cutter with diagonal auxiliary cutting lines to prevent the weeds, vines and grass from getting to the shaft.

A related object of the present invention is to provide weed cutter that forms two cone shaped guard volumes, one extending upwardly and the other extending downwardly, to protect the shaft from tangling with weeds, vines, grass and the like.

Another object is to provide a weed cutter in accordance with the present disclosure which employs metallic braided wire for auxiliary cutting lines.

A related object is to provide auxiliary wires which are sufficiently short to remain within the radius of the main spool thereby avoiding inadvertent contact with the operator.

A related object is to provide a weed cutter wherein the spool mounting the auxiliary metal wires is confined between the main spool and the frame within the radius of the main spool to avoid inadvertent contact with the operator.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
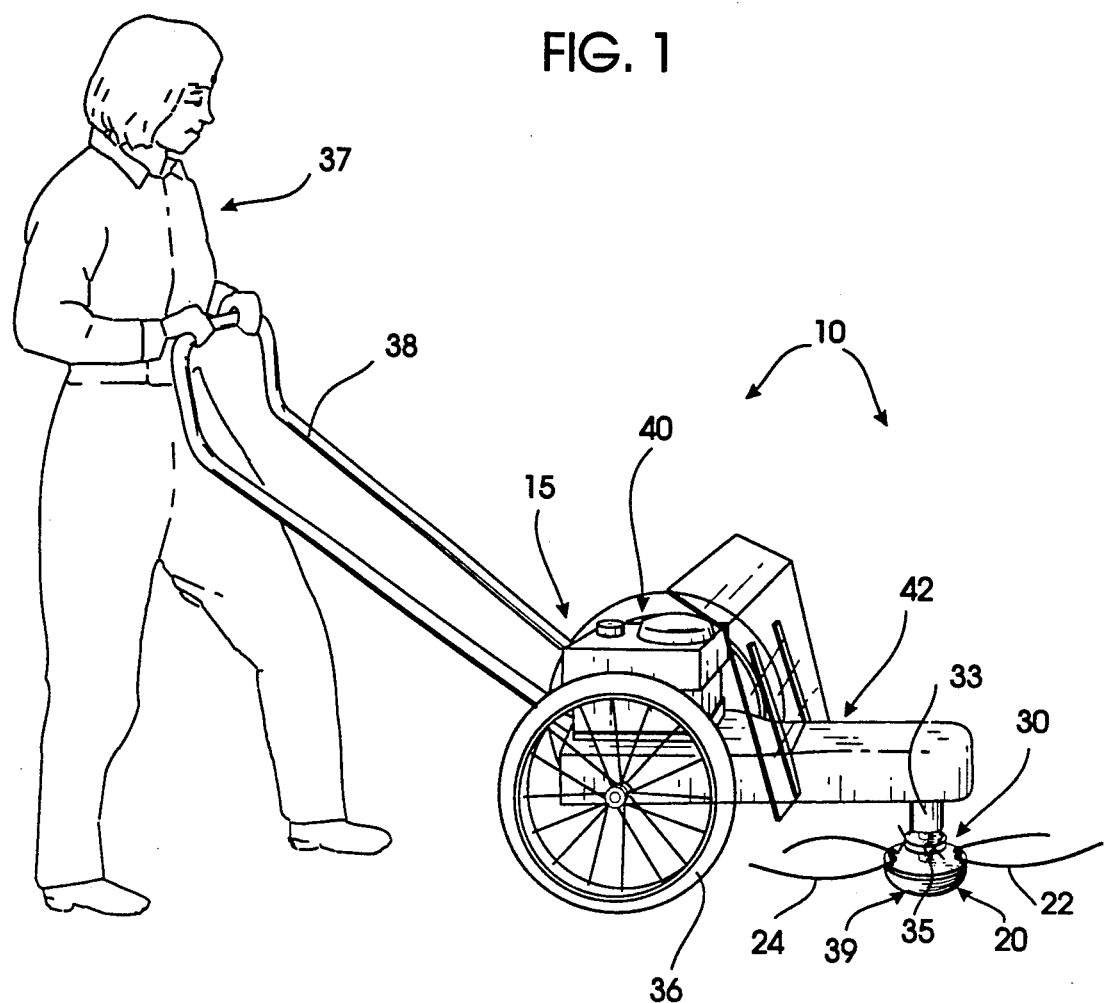
FIG. 1 is a fragmentary perspective view showing the preferred embodiment of my Jam-Proof Rotary Weed Cutter.
Figure 2:
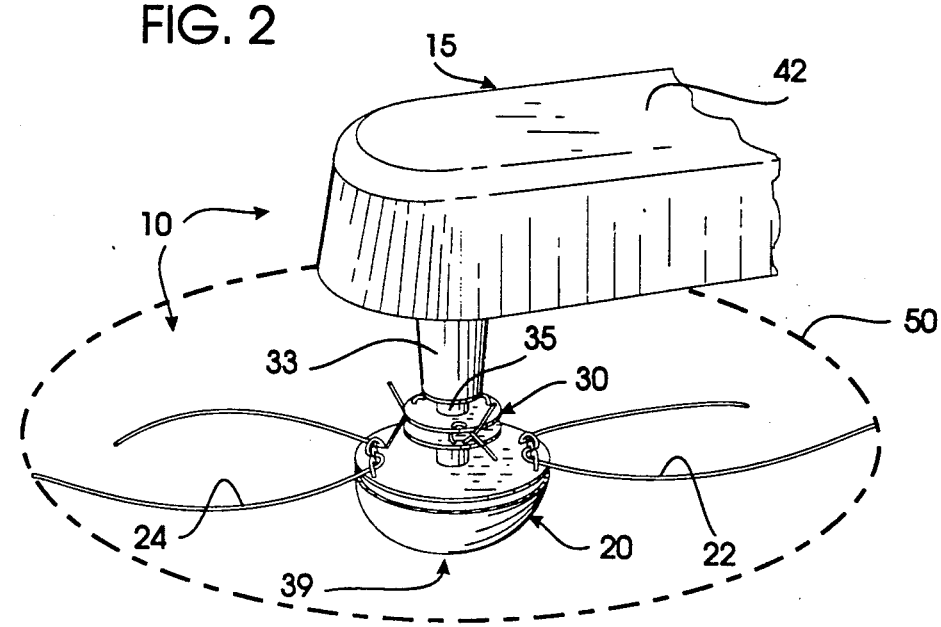
FIG. 2 is an enlarged, fragmentary isometric view of the cutting head and associated frame of my improved weed cutter.
Figure 3:
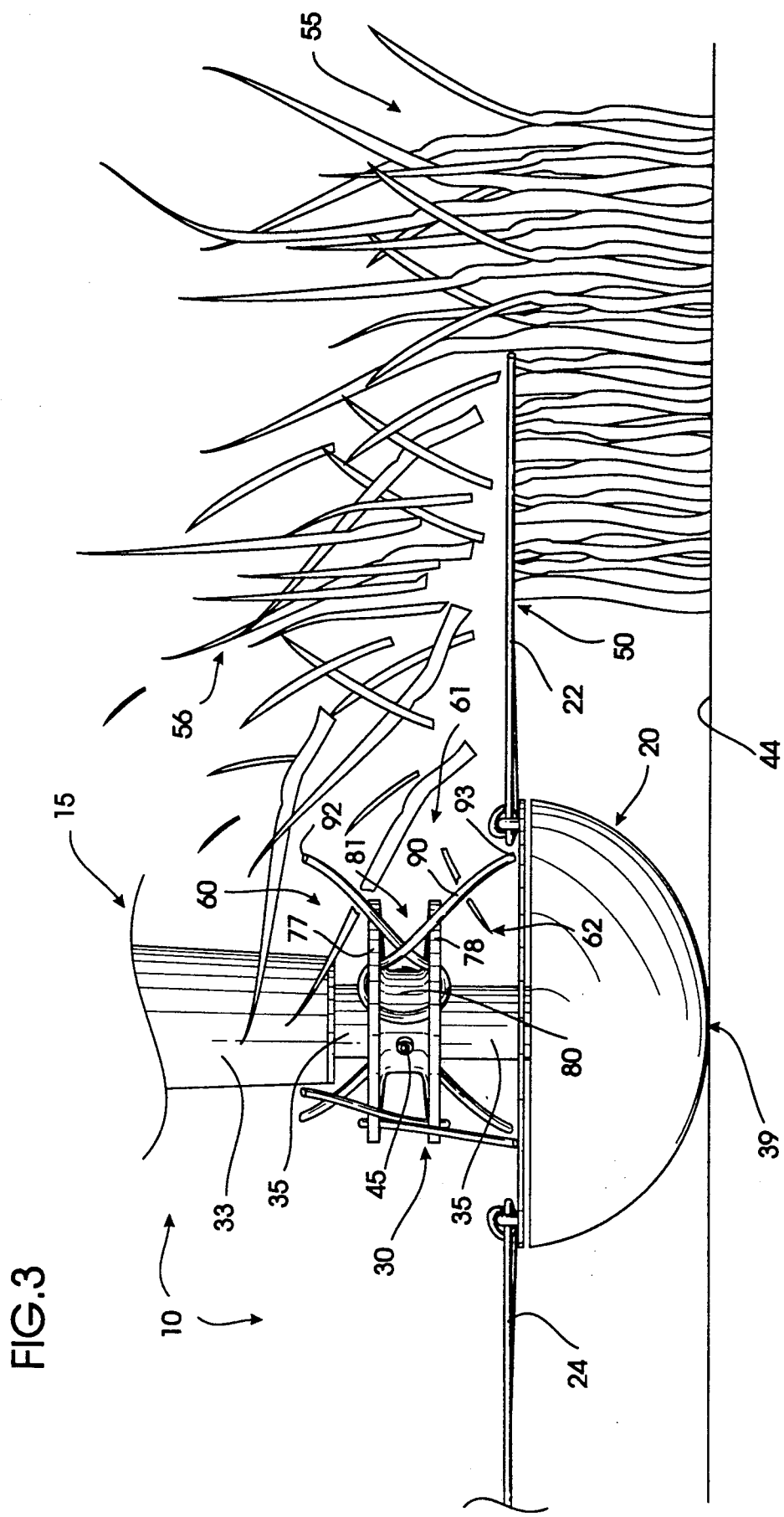
FIG. 3 is an enlarged, fragmentary isometric view of the cutting head.

Turning now to the drawings, the best mode of my improved rotary weed cutter illustrated in FIGS. 1–6 has been generally designated by the reference numeral 10. The present invention modifies prior weed cutting machines such as rotary machine 15. It can be used in conjunction with "push" type machines 15 illustrated, or with hand held units. As seen in FIGS. 1 through 3, my Jam-Proof Rotary Weed Cutter employs a main spool 20 mounting a pair of diametrically opposed filaments 22, 24. Importantly, an auxiliary, anti-jamming spool 30 prevents weeds and the like from winding around the exposed drive shaft 35 and jamming the machine.

Weed cutting machine 15 employs a motor 40 mounted to a rigid frame 42. Two large semi-pneumatic tired wheels 36 are rotatably mounted to the frame 42 to support the rear portion of the machine 15. The machine is intended to be operated by a person 37 pushing the machine by a handle 38 mounted to the frame 42, much like a conventional push lawn mower. The main rotatable spool 20 has a hemispherical lower portion 39 intended to ride on the ground 44 to support the forward portion of the machine 15. The motor 40 may be electric, or it may comprise a conventional internal combustion unit. In either case the motor powers a drive shaft 35 extending from a bearing housing 33. In the present invention main spool 20 can take on a variety of configurations known to the art, and it is mounted on the shaft 35. Generally speaking, a set screw 45 may be employed to mount components, such as the present auxiliary spool 30 on the shaft 35. Alternatively, the shaft 35 may employ a keyway and keystock to register components mounted on the shaft 35.

Motor 40 rotates the shaft 35 through a belt drive system housed in the machine's frame 42, thereby forcibly rotating the main and auxiliary spools 20, 30. The main spool 20 mounts two or more flails or filaments 22, 24. These filaments 22, 24 are generally made of plastic, mono-filament line or similar material. However, braided wire, which may be plastic coated, is used by some weed cutters. When the main spool 20 is rotated at high speed by the motor 40 the filaments 22, 24 create a cutting plane 50 capable of cutting weeds, vines and the like 55 (FIG. 3).

Figure 4:
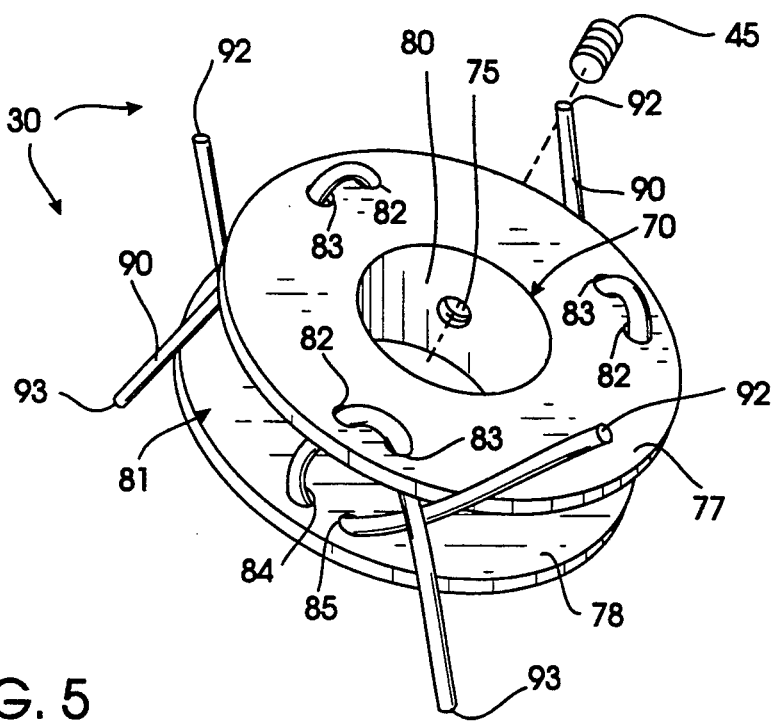
FIG. 4 is an enlarged, partially exploded isometric view of the preferred auxiliary spool with portions omitted for clarity.
Figure 5:
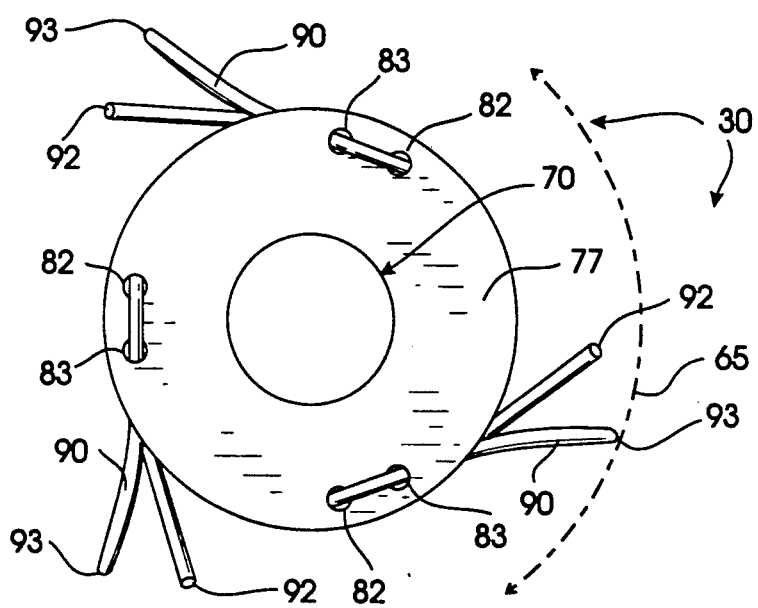
FIG. 5 is an enlarged, fragmentary top plan view of the preferred auxiliary spool; and, FIG. 6 is an enlarged, fragmentary side elevational view of the preferred auxiliary spool.
Figure 6:
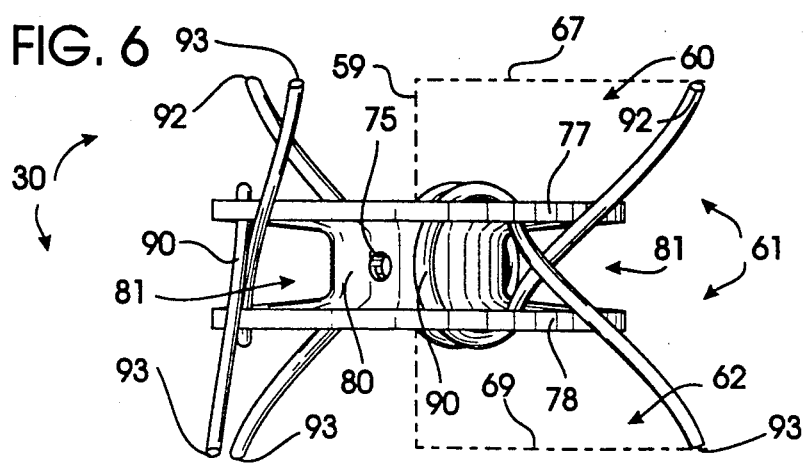

The auxiliary spool 30 is mounted on the shaft 35 between the main spool 20 and the frame 42. Turning to FIGS. 4 through 6, the aforementioned auxiliary spool 30 is depicted in detail. A central orifice 70 accommodates the shaft 35 of the weed cutter 15. A threaded set screw hole 75 is defined in the wall of the central orifice 70. As mentioned above, a set screw 45 is used to secure the auxiliary spool 30 on the shaft 35. Thus, the auxiliary spool 30 is fixed relative to the main spool 20. More than one set screw 45 and set screw hole 75 may be employed to facilitate securing the auxiliary spool 30 in place.

Auxiliary spool 30 is preferably comprised of separate upper and a lower disks 77, 78 spaced apart by a central hub 80, through which the central orifice 70 passes. Therefore, a space 81 is defined between the disks 77, 78. Each disk 77, 78 has a plurality of paired orifices 82, 83, or 84, 85 drilled about its periphery. A pair of orifices 82, 83 or 84, 85 are drilled in each disk 77 or 78 respectively. The orifices 82, 83 in the upper disk 77 index with the orifices 84, 85 in the lower disk.

The present invention can employ plastic, mono-filament or metallic cutting filaments 90. An end 92 of the filament 90 is passed from the space 81 between the disks 77, 78 upwardly through one of the orifices 83, in the upper disk 77, turned downwardly and passed through the other orifice 82 in the upper disk 77. The line 90 is next passed through the space 81 between the disks 77, 78 and into the orifice 84 (in the lower disk 78) indexed with the last mentioned orifice 82. Then the line 90 is turned upward and passed through the other orifice 85 of the lower disk 78. The bitter ends 92, 93 of the line 90 are left unanchored to provide cutting action in the vicinity of the shaft 35. Hence, the line 90 is held in a flexible "α-shaped" configuration.

Guard filament ends 92, 93 project outwardly at an incline. As apparent in FIG. 3, when the auxiliary spool 30 is rotated at high speed, two cone-shaped guard volumes 60, 62 are created by the rotating guard filaments. One cone shaped volume 60 extends upwardly from the auxiliary spool 30 while the other cone 62 extends downwardly. The primary purpose of these cone shaped guard volumes 60, 62 is to aggressively recut cut sections of weeds or vines 56 before they can wrap about the machine's shaft 35. This prevents the drag or jamming that is commonplace in prior art machines. If metal cutting line is employed, safety is maintained due to the positioning of the auxiliary spool 30. Since the auxiliary spool's cutting lines 90 are relatively short and the auxiliary spool 30 is captivated between the main spool 20 and the frame 42, the operator 37 is safe from inadvertent contact with the cone shaped guard volumes 60, 62.

Thus in the present invention auxiliary spool 30 creates a guard zone 61 (FIG. 6) that prevents weeds and the like from winding around the drive shaft. Guard zone 61 comprises an upper inverted-cone-shaped volume 60 coaxial with a lower, cone-shaped volume 62. Cone-shaped guard volumes 60, 62 are coaxial. Guard zone 61 is thus defined by spinning of the filaments 92, 93 about the drive shaft axis of rotation 59. The upper radial edge of the guard zone 61 and cone 60 has been designated with the reference numeral 65 (FIG. 5). The lower surface of the bottom cone 62 and zone 61 has been designated 67. Surface 67 forms the bottom of the guard zone 61, and it is disposed adjacent the cutting plane established by filaments 22, 24. The top surface 69 of zone 61 and cone 60 terminates adjacent the bottom of housing 33 (FIG. 3) to prevent weeds from contacting drive shaft 35.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rotary weed trimming tool comprising:
   a rigid frame adapted to be held by a user;
   a motor mounted to said frame for powering said tool;
   a drive shaft driven by said motor;
   a main rotatable spool secured to said drive shaft and spaced apart from said motor, said main spool supporting at least one outwardly projecting cutting filament forming a cutting plane; and,
   an auxiliary rotatable spool secured on said shaft between said main spool and said motor, said auxiliary spool comprising:
   separate, spaced apart upper disk and lower disks defining a space therebetween;
   a plurality of peripheral orifices defined in each of said disks; and,
   guard filaments at least partially captivated within said orifices, said filaments creating two coaxial cone-shaped guard volumes, one guard volume extending upwardly from said disks and the other volume extending downwardly from said disk to said cutting plane to prevent jamming of said drive shaft.

2. The rotary weed trimming tool as defined in claim 1 wherein said orifices are disposed in pairs.

3. The rotary weed trimming tool as defined in claim 2 wherein said pairs of orifices are equidistant from one another.

4. The rotary weed trimming tool as defined in claim 3 wherein said pairs of orifices in each of said disks are coaxially aligned.

5. The rotary weed trimming tool as defined in claim 4 wherein said filament passes through a coaxially aligned orifice in each of said disks and bends to pass through each of the paired orifices associated with the last mentioned aligned orifices.

6. The rotary weed trimming tool as defined in claim 4 wherein said guard filaments are metallic.

7. A rotary weed trimming tool comprising:
   a rigid frame comprising a handle adapted to be held by a user;
   a motor mounted to said frame;
   a drive shaft extending from said motor;
   a main rotatable spool secured to said drive shaft, said spool having a plurality of radially spaced apart filaments for contacting and cutting weeds and the like; and,
   an auxiliary rotatable spool secured to said shaft between said main spool and said motor, said auxiliary spool mounting a plurality of diagonally oriented guard filaments for preventing jamming of said drive shaft.

8. The rotary weed trimming tool as defined in claim 7 wherein said auxiliary spool comprises two spaced apart disks defining a space therebetween, said disk joined by a central coaxial hub.

9. The rotary weed trimming tool as defined in claim 8 wherein said filaments are coupled to said auxiliary spool at the periphery of said disks.

10. The rotary weed trimming tool as defined in claim 9 wherein said filaments are disposed circumferentially equidistant from one another.

11. The rotary weed trimming tool as defined in claim 7 wherein said guard filaments are retained in orifices defined in the periphery of said disks, said filaments creating two cone shaped guard volumes when said auxiliary spool is rotated, one cone extending upwardly and the other cone extending downwardly to prevent jamming of said shaft during use.

12. The rotary weed trimming tool as defined in claim 11 wherein said guard filaments are metallic.

13. A rotary weed trimming and cutting tool comprising:
   a rigid frame;
   a drive shaft projecting from said frame;
   motor means for forcibly rotating said drive shaft;
   main rotatable spool means secured to said drive shaft;
   a filament operatively attached to said main spool means for contacting and cutting weeds and the like; and,
   auxiliary rotatably spool means spaced apart from said main spool means and including at least one filament connected thereto for establishing a guard zone about said drive shaft to prevent jamming.

14. The rotary weed trimming tool as defined in claim 13 wherein said auxiliary spool means comprises a plurality of outwardly projecting guard filaments for guarding said drive shaft.

15. The rotary weed trimming tool as defined in claim 14 wherein said filaments diagonally extend outwardly from said auxiliary spool means.

16. The rotary weed trimming tool as defined in claim 15 wherein said filaments are metallic.

17. The rotary weed trimming tool as defined in claim 14 wherein one of said guard filaments extends diagonally upwardly outwardly from said auxiliary spool means, and another extends downwardly outwardly from said auxiliary spool means to form an anti-jamming zone of protection having a volume approximating a pair of axially aligned cones.

* * * * *